US006389450B1

(12) United States Patent
Butman et al.

(10) Patent No.: US 6,389,450 B1
(45) Date of Patent: *May 14, 2002

(54) CLIENT COMMUNICATIONS RECEIPT SYSTEM

(75) Inventors: Ronald A. Butman, Nahant; Raja Ramachandran, Allston; Thomas A. Burns, Duxbury; Thomas J. Malone, South Boston; Michael D. Kmiec, Boston; Joseph C. Dougherty, West Roxbury, all of MA (US)

(73) Assignee: PFN, Inc., Charlestown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/241,464

(22) Filed: Feb. 1, 1999

Related U.S. Application Data

(63) Continuation-in-part of application No. 08/822,902, filed on Mar. 24, 1997, now Pat. No. 5,870,562, and a continuation-in-part of application No. 08/823,428, filed on Mar. 24, 1997, now Pat. No. 5,867,665, and a continuation-in-part of application No. 08/822,898, filed on Mar. 24, 1997, now Pat. No. 5,867,667, and a continuation-in-part of application No. 08/828,833, filed on Mar. 24, 1997, now Pat. No. 6,026,430, and a continuation-in-part of application No. 08/828,142, filed on Mar. 24, 1997, now Pat. No. 5,884,035.

(51) Int. Cl.$^7$ .............................................. G06F 13/00

(52) U.S. Cl. ........................................ 709/201; 709/249
(58) Field of Search ................................. 707/102, 203; 709/205, 206, 207, 218, 237, 246, 201, 249

(56) References Cited

U.S. PATENT DOCUMENTS

| 5,842,216 | A | * | 11/1998 | Anderson et al. ............ 707/203 |
| 5,867,667 | A | * | 2/1999 | Butman et al. ............... 709/249 |
| 5,898,836 | A | * | 4/1999 | Freivald et al. .............. 709/218 |
| 6,029,171 | A | * | 2/2000 | Smiga et al. ................ 707/102 |
| 6,163,809 | A | * | 12/2000 | Buckley ....................... 709/237 |

OTHER PUBLICATIONS

"Microsoft Exchange User's Handbook" by Sue Mosher ; published by Duke Press, 1997.*

* cited by examiner

Primary Examiner—Dung C. Dinh
Assistant Examiner—Walter Benson
(74) Attorney, Agent, or Firm—Maureen Stretch

(57) ABSTRACT

A method for creating distributed objects representing receipt requests which are sent with a primary distributed object, indicating a receipt is requested when the primary distributed object has been received at a client side communications server or accessed by a member of a workgroup, or both.

4 Claims, 5 Drawing Sheets

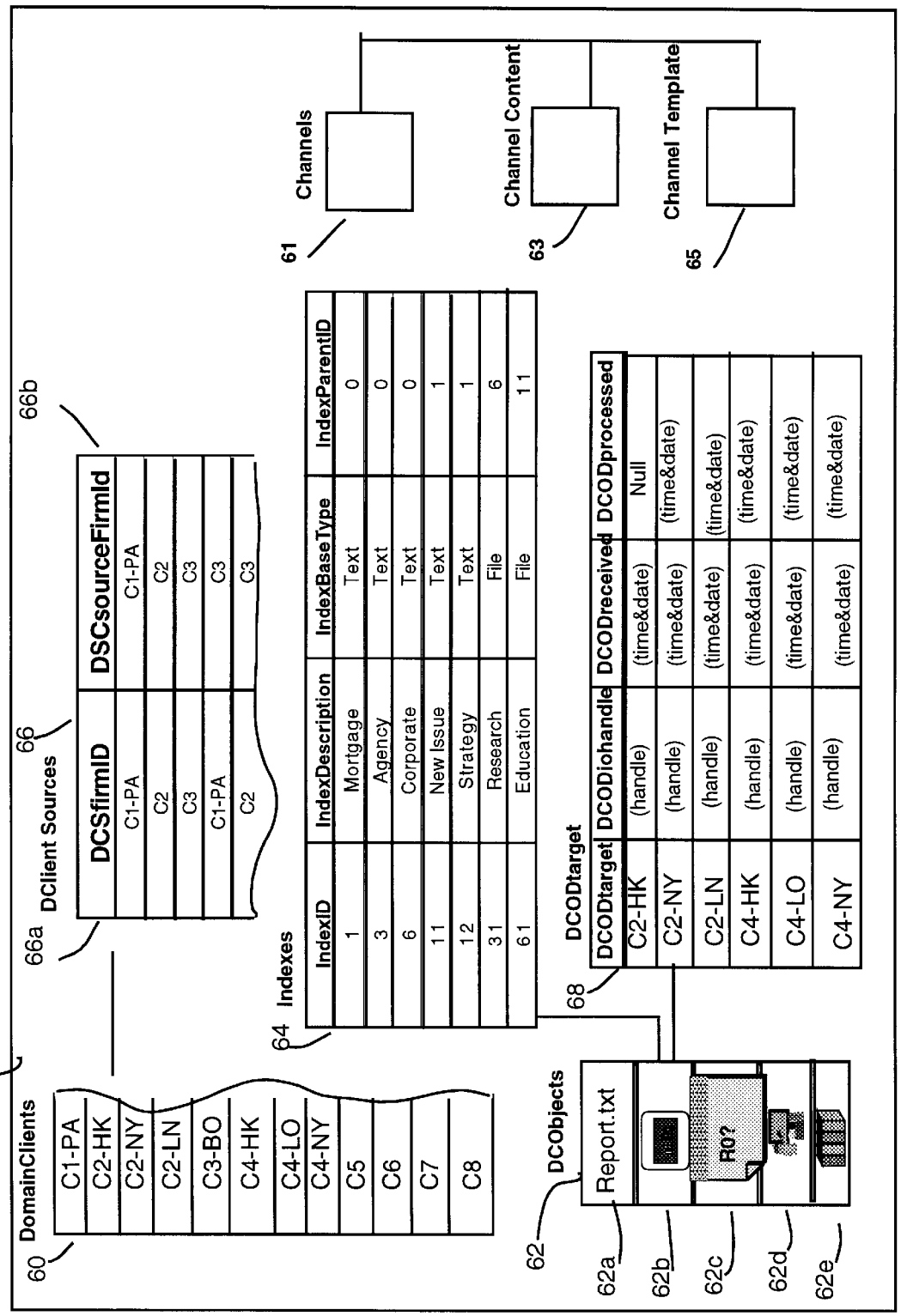

CLIENT COMMUNICATIONS RECEIPT SYSTEM

This application is a Continuation -in- Part of application Ser. No. 08/822,902, filed Mar. 24, 1997 and now U.S. Pat. No. 5,870,562 by Butman et al., entitled Universal Domain Routing And Publication Control System, and application Ser. No. 08/823,428, filed Mar. 24, 1997 and now U.S. Pat. No. 5,867,665 by Butman et al., entitled Domain Communications Server Apparatus And Method, and application Ser. No. 08/822,898, filed Mar. 24, 1997 and now U.S. Pat. No. 5,867,667 by Butman et al., entitled Client Side Communications Server Apparatus And Method, and application Ser. No. 08/828,833, filed Mar. 24, 1997 and now U.S. Pat. No. 6,026,430 by Butman et al., entitled Dynamic Client Registry Apparatus And Method, and application Ser. No. 08/828,142, filed Mar. 24, 1997 and now U.S. Pat. No. 5,844,035 by Butman et al., entitled Dynamic Group Registry Apparatus And Method.

BACKGROUND OF THE INVENTION

1. Field of the Invention

This invention relates generally to the field of networking computer systems and more particularly to the field of systems for providing control over distribution, redistribution, access security, filtering, organizing and display of information across disparate networks.

2. Background

In most industries and professions today there is a rapidly increasing need for intercompany as well as intracompany communications. Most companies, firms, and institutions want to allow their employees to communicate internally, with other employees, and externally with the firm's customers, vendors, information sources, and others throughout a work day. Depending on the nature of the information and the relationship between the parties, these communications may need to take the form of one-to-one communiques in some cases, one-to-many broadcasts in others, many to many communications, and even many-to-one communications. Some of these categories might also provide better information for all concerned if the flow of data is interactive and collaborative, allowing recipients to comment, share, and build upon what has already been received.

Most large private networks are built of complex sets of:

Local Area Networks (LAN) - a set of computers located within a fairly small physical area, usually less than 2 miles, and linked to each other by high speed cables or other connections; and Wide Area Networks (WAN) - groups of Local Area Networks that are linked to each other over high speed long distance communications lines or satellites that convey data quickly over long distances, forming the "backbone" of the internal network.

These private internal networks use complex hardware and software to transmit, route, and receive messages internally.

Sharing and distributing information inside a corporate network has been made somewhat easier by using client/server technology, web browsers, and hypertext technology used in the Internet, on an internal basis, as the first steps towards creating "intranets." In typical client/server technology, one computer acts as the "back end" or server to perform complex tasks for the users, while other, smaller computers or terminals are the "front-end" or "clients" that communicate with the user. In a client/server approach the client requests data from the server. A web server is a program that acts as a server function for hypertext information. In large private networks, a server computer might have web server software operating on it to handle hypertext communications within the company's internal network. At the web server site, one or more people would create documents in hypertext format and make them available at the server. In many companies, employees would have personal computers at their desks connected to the internal network. In an "intranet" these employees would use a web browser on their personal computers to see what hypertext documents are available at the web server. While this has been an advance for internal communications over a private network, it requires personnel familiar with HyperText Markup Language (HTML) the language that is used to create hypertext links in documents to create and maintain the "internal" web pages. If a more interactive approach is desired, an Information Technology (IT) specialist in some form of scripting, such as CGI, PERL, is needed who can create forms documents and procedures to allow users to ask for information from the server.

It is now increasingly common for intranets to connect to the Internet forming what is sometimes called an "extranet." The Internet, however, is essentially a passive transmission system. There is no automatic notification sent to clients or customers that a new report is available on a given Internet Web page that is external to the client's intranet. Customers or clients normally would have to search the Internet periodically to see if a Web page has changed, and if the change is something he or she is interested in seeing. Some Web page sites that provide fee services use e-mail to notify prospective users that the new data is available. As mentioned, e-mail is slow, so if the data is also time-sensitive, the notification may not reach the customer until later in the day, when it may be of much less value.

It is an object of the present invention to provide receipts for communications sent.

SUMMARY OF THE INVENTION

This is achieved by a method for creating distributed objects representing receipt requests which are sent with a primary distributed object, indicating a receipt is requested when the primary distributed object has been received at a client side communications server or accessed by a member of a workgroup, or both.

BRIEF DESCRIPTION OF THE DRAWINGS

FIG. 2a is a block diagram of an illustrative dynamic client registry at a client domain server according to the method and apparatus of the present invention.

DETAILED DESCRIPTION OF THE INVENTION

Co-pending application Ser. No. 08/822,902, filed Mar. 24, 1997 and now U.S. Pat. No. 5,870,562 by Butman et al., entitled Universal Domain Routing And Publication Control System; and co-pending application Ser. No. 08/823,428, filed Mar. 24, 1997, and now U.S. Pat. No. 5,867,665 by Butman et al., entitled Domain Communications Server Apparatus And Method, and co-pending application Ser. No. 08/822,898, filed Mar. 24, 1997 and now U.S. Pat. No. 5,867,667 by Butman et al., entitled Client Side Communications Server Apparatus And Method, and co-pending application Ser. No. 08/828,833, filed Mar. 24, 1997, and now U.S. Pat. No. 6,026,430 by Butman et al., entitled Dynamic Client Registry Apparatus And Method, and co-pending application Ser. No. 08/828,142, filed Mar. 24, 1997, and now U.S. Pat. No. 5,884,035 by Butman et al., entitled Dynamic Group Registry Apparatus And Method, and co-pending application Ser. No. 09/241,465 filed of even date herewith and now U.S. Pat. No. 6,128,645 by Butman et al., and entitled Hyper and Client Domain Servers, are specifically incorporated by reference herein, and made a part hereof and hereinafter referred to as Co-pending applications. They generally describe a system and method for creating and operating domain communications servers and client side communications servers to create a communications infrastructure for dynamically routing various types of information over one or more networks.

Figure 1:
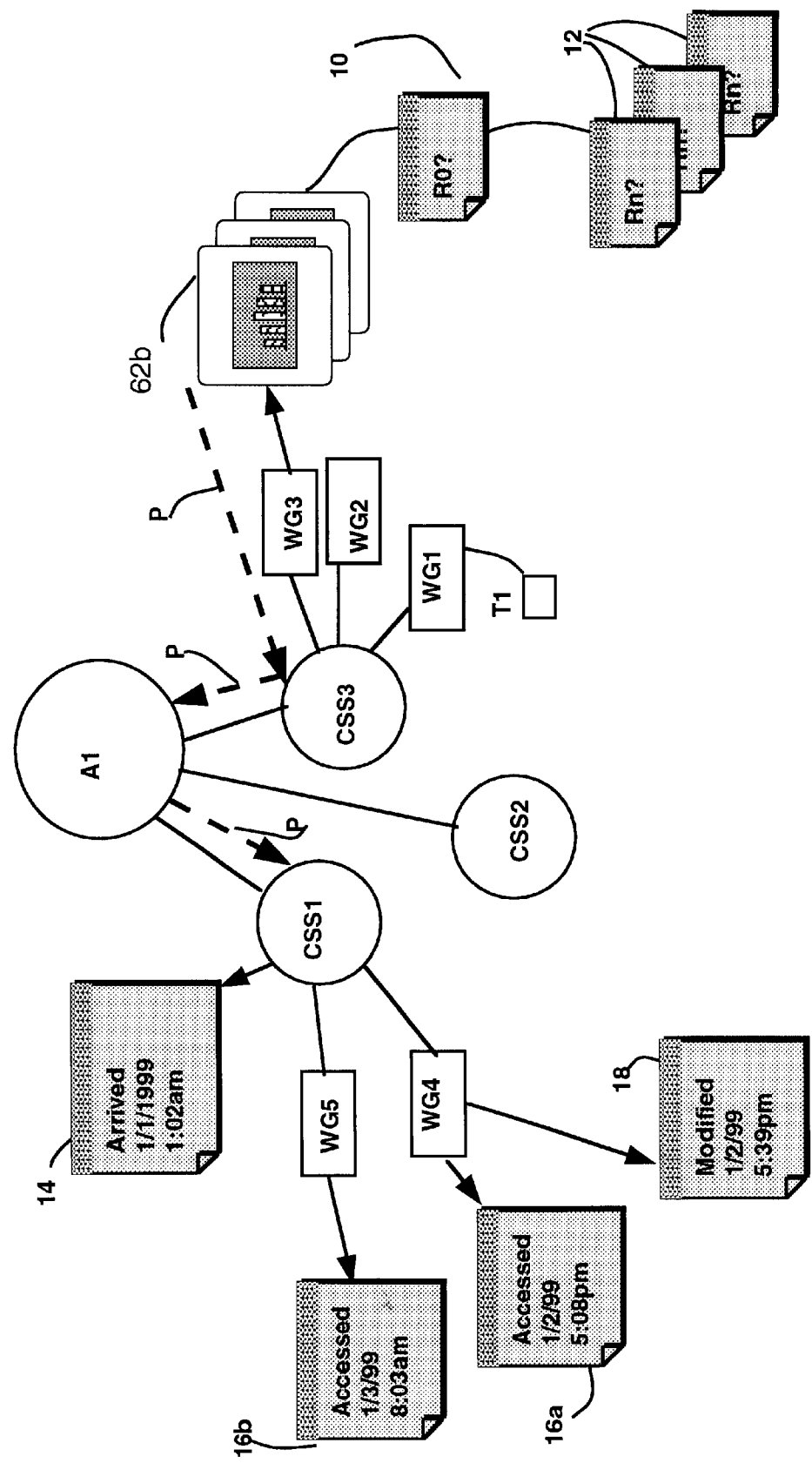
FIG. 1 is a schematic drawing of the present invention.

As seen in FIG. 1, using the methods described in these Co-pending applications, communications in the form of a primary distributed object 62b are sent from a work group WG3 through a client side communications server CSS3 over path P to client domain server A1 which routes primary distributed object 62b to client side communications server CSS1 which is authorized to receive it. In this embodiment of the invention, primary distributed objects can now be sent with receipt requests 10 and 12. (Receipt requests 10 and 12 are also sent as distributed objects 62c as seen in FIG. 2a.)

For example, and returning to FIG. 1, if distributed object 62b is a slide show presentation created by a member of work group WG3 at client side communications server CSS3, the originator may request that he or she be notified automatically by the invention when primary distributed object 62b has arrived at its destination (in this case client side communications server CSS1) and also when each of the individuals authorized to access it have done so at their respective work groups WG4 and WG5. Note that receipt 16a, for example, indicates that the recipient in workgroup WG4 actually accessed the slide presentation at 5:08pm on Jan. 2, 1999. The recipient at WG5 did not access it until 8:03am the next day.

Still in FIG. 1, an additional type of receipt, one for modification can also be requested. As seen here, the primary distributed object was not only accessed by a recipient in WG4, but it was also modified by the same recipient, as shown by receipt 18. Such receipts are useful for situations in which version control or document control are critical.

In this embodiment of the present invention, receipt processing is handled by the client side communications server CSS of the present invention.

Figure 4B:
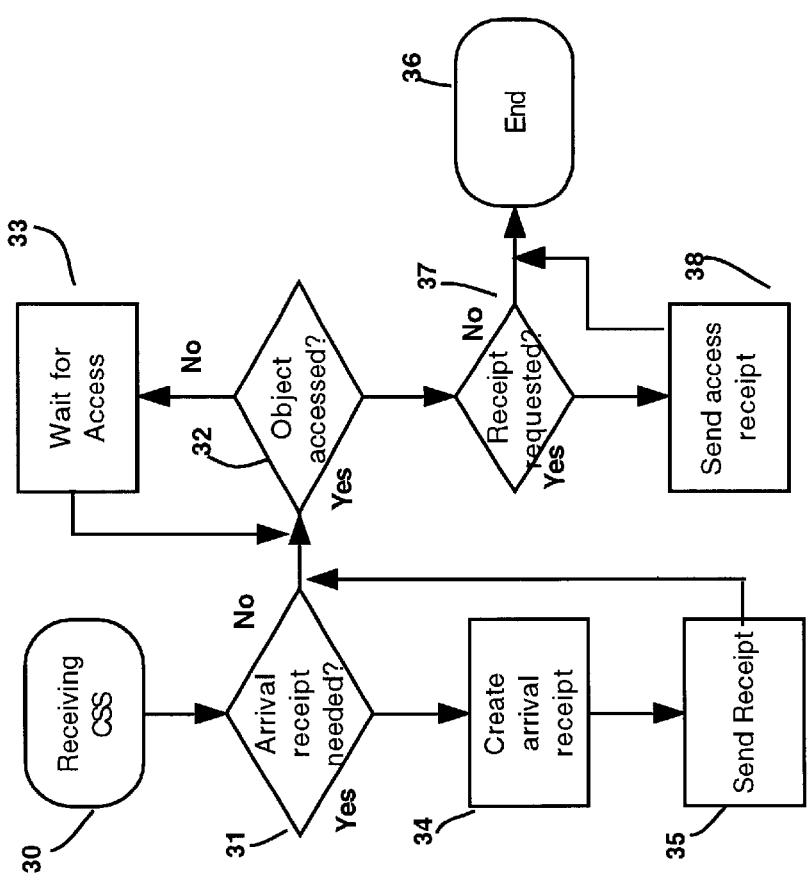
FIGS. 4a and 4b are flow diagrams of the present invention.
Figure 4A:
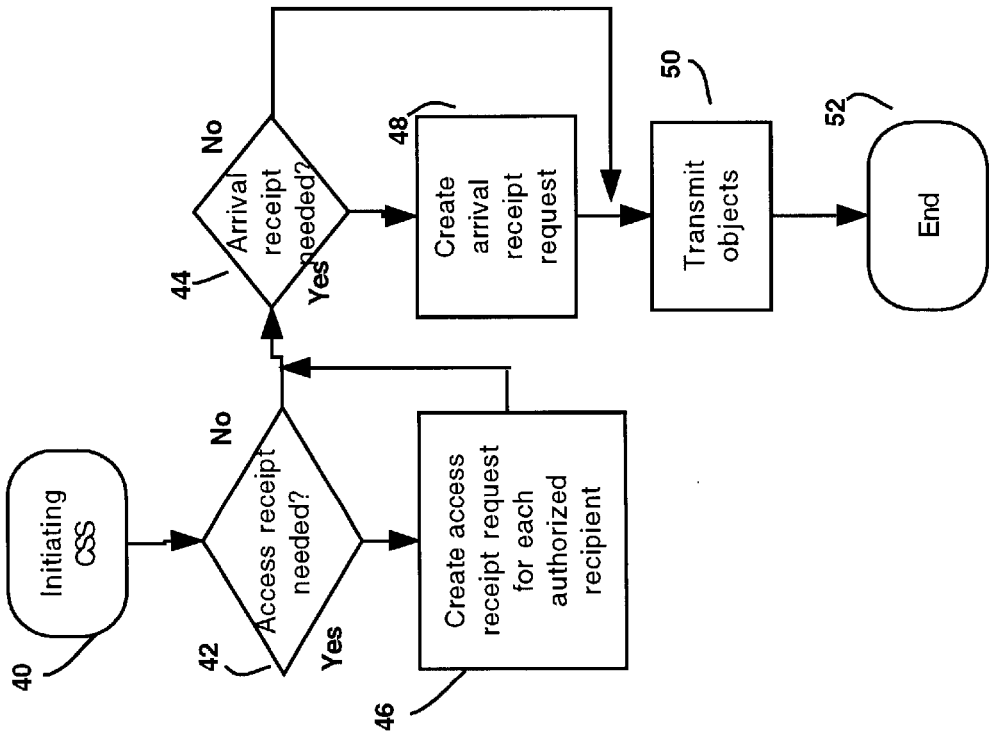

In FIG. 4a, for example, the processing done by an initiating client side communications server CSS is shown. At decision block 42, the client side communications server CSS which is about to transmit primary distributed object 62b, the slide presentation, checks to see if an access receipt is being requested by the author or sender. If one is, at step 46 the initiating client side communications server creates an access receipt request for each authorized recipient of the distributed object 62b. If no access requests were needed or after processing of them, the invention proceeds to decision block 44. There it determines whether the author or sender wishes to request an arrival receipt. If one is requested, an arrival receipt request is created at step 48. Finally, at step 50 the distributed objects, with or without the appropriate receipt requests are transmitted or scheduled for transmission.

Now in FIG. 4b, at the receiving client side communications server, at decision block 31, a check is made to see if an arrival receipt is requested. If it is, at step 34, one is created using the arrival time and date information. The arrival receipt is sent at step 35. Next, at decision block 32, a check is made to see if a primary distributed object has been accessed by each recipient. If it has not, the present invention waits, at step 33, until the object has been accessed. If occurs, and it is determined at step 37 that access receipts have been requested, a receipt for that is sent out to the originator at step 38. If no receipt has been requested, this portion of processing ends at step 36.

Now turning to FIG. 2a, typical client information kept by a client domain server A1 in a dynamic client registry 06 is shown. Dynamic client registry 06 includes a domain clients table 60 (here shown in abbreviated form), a domain clients sources list 66, domain client objects table 62 and domain client objects destination list 68 and an index table 64, as well as a channels table 61, a channel content table 63, and a channel template table 65. A domain clients table 60 lists all the client side communications servers within the given domain.

Still in FIG. 2a a domain client objects table 62 is shown, as well. The domain client objects table contains all distributed objects received by the client domain server from any valid client side communications server within the given domain. Upon receipt of such an object, the client domain server notifies all client side communications servers having authorized access to that object that an object is available to be retrieved. Each entry in the domain client objects table 62 points to a different domain client object destinations table 68 that lists all the client side communications server sites that are authorized and destined to receive the domain client object.

Figure 2B:
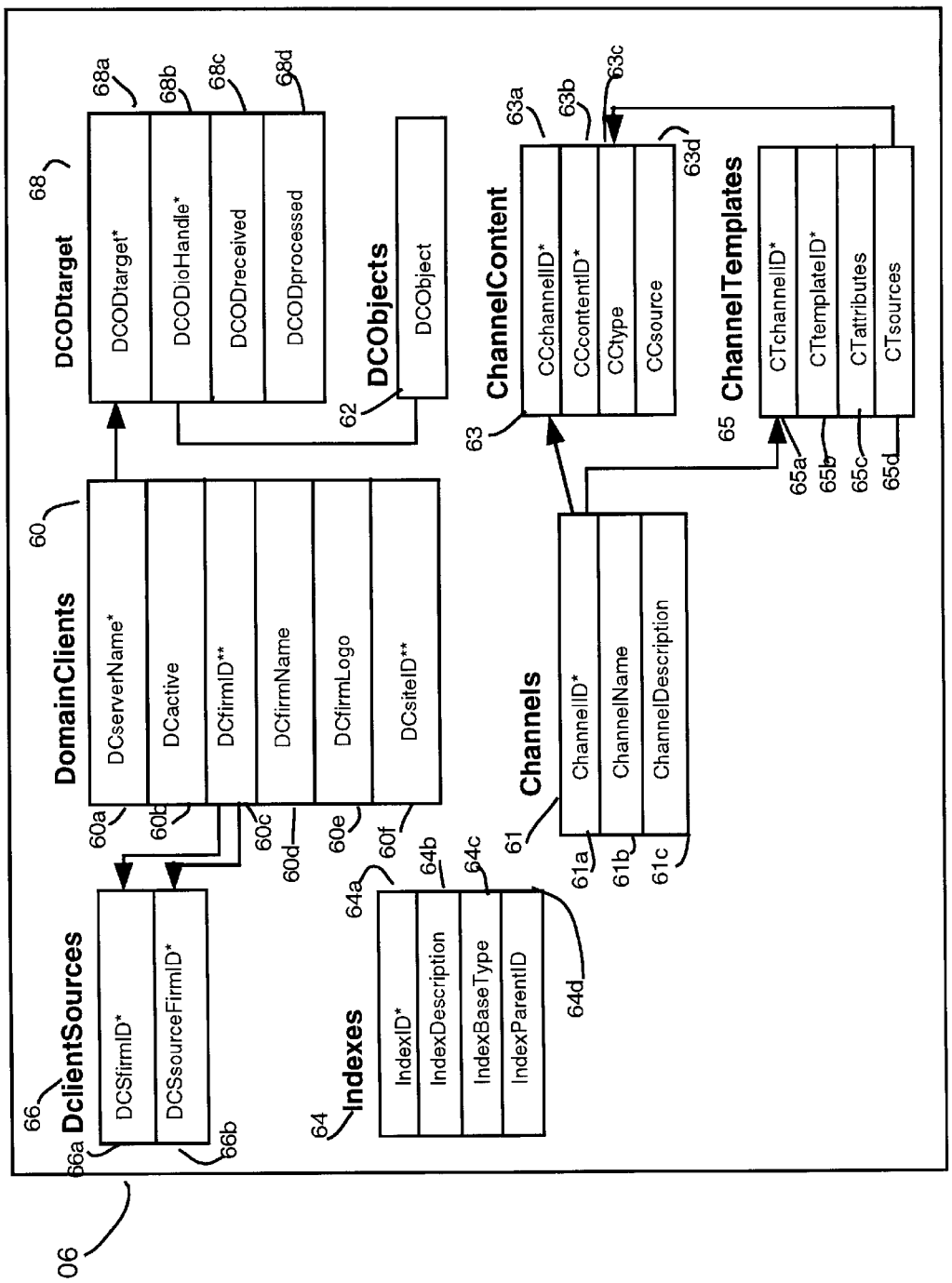
FIG. 2b is a block diagram illustrative of the fields of a dynamic client registry at a client domain server of the present invention.

Referring briefly to FIG. 2b, with a domain client object destinations table entry, the domain client target table 68a lists all the server names of the client side communications servers to which this object is destined. The domain client received column 68c contains, for each targeted client side communications server, the time the object was received by the client domain server. The domain client processed table 68d contains, for each client side communications server, the time the object was processed by the client side communications server.

Figure 3:
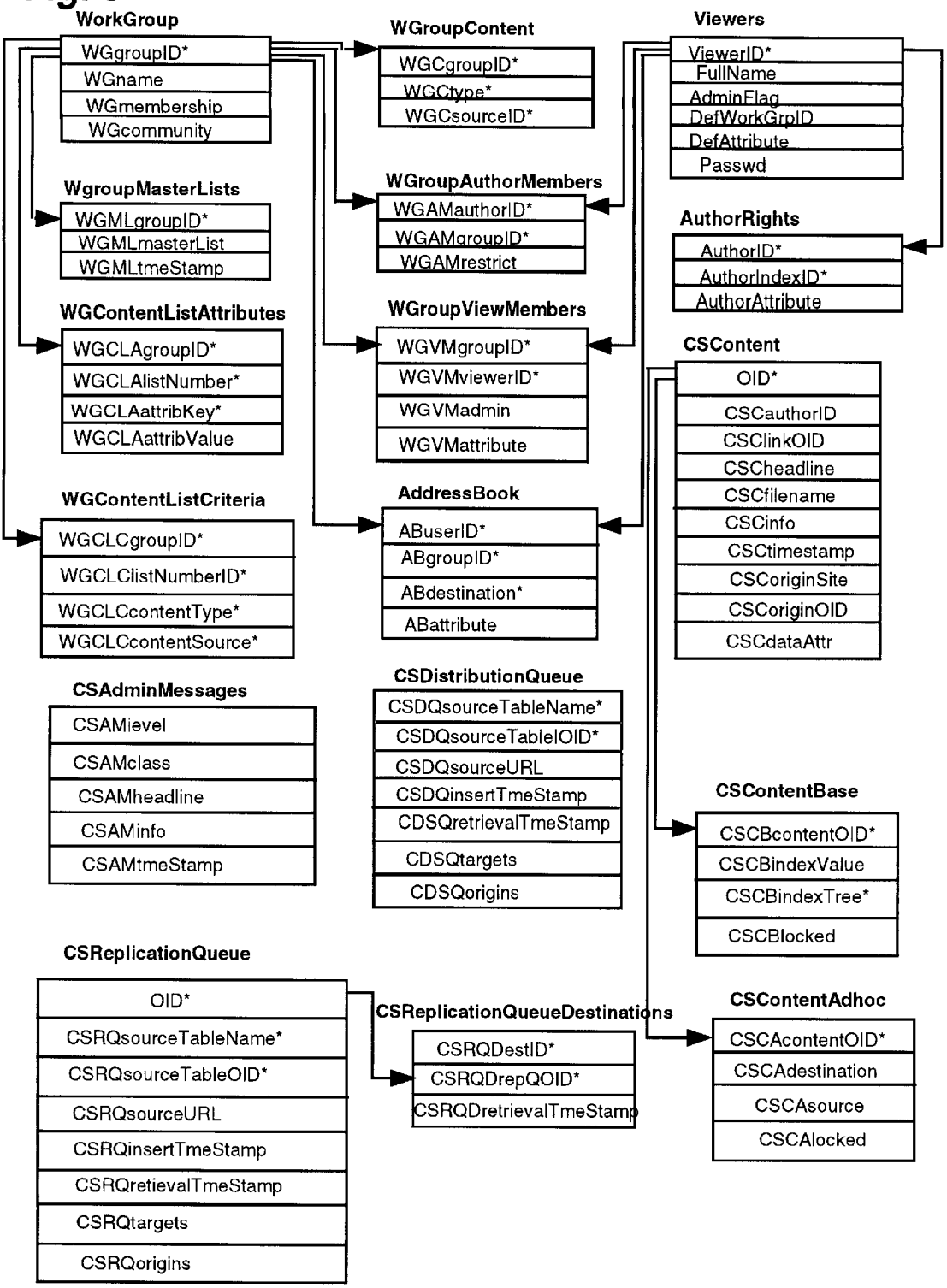
FIG. 3 is a detailed block diagram illustrative of the fields of a dynamic group registry at a client side communications server of the present invention.

Now in FIG. 3, primary distributed objects are tracked by dynamic group registry tables, such as those shown here. The tables CSContent, CSContentBase, and CSContentAd-hoc point to such primary distributed objects. In a preferred embodiment, the distributed receipt request objects are not kept at the work group level, but at the client side communications server CSS level.

While a preferred embodiment of the present invention is implemented as a program written in the C++ programming language and operates as agents on personal computers or workstations using the NT or Unix operating systems, as will be apparent to those skilled in the art, other programming languages and operating systems could be used. Additionally, although the preferred embodiment uses a software program implementation, it will be apparent that some or all of the logic of the present invention could also be embodied in firmware or hardware circuitry.

Those skilled in the art will appreciate that the embodiments described above are illustrative only and that other systems in the spirit of the teachings herein fall within the scope of the invention.

What is claimed is:

1. A method for creating distributed objects to notify receipt of another distributed object over a client domain server network infrastructure having at least one client entity, comprising the steps of:

establishing a plurality of publication computers in communications relationship with each other inside the client entity, each of said publication computers having electronic storage media for storing a dynamic group registry thereon and for storing resource locators containing function names thereon, each publication computer further comprising a web server program which, when executed by the publication computer, causes the publication computer to respond to resource locators by calling the function name indicated therein into the publication computer, each publication computer further comprising a database management program for organizing the dynamic group registry;

loading a client side communications server program in each publication computer in response to the appropriate resource locator therefor for responding to resource locators directed to the client side communications server program and for directing the database management program in organizing the dynamic group registry;

designating a domain computer having electronic storage media for storing a dynamic client registry thereon and for storing resource locators containing function names thereon, the domain computer further comprising a web server program which, when executed by the domain computer, causes the domain computer to respond to the resource locators by calling the function name indicated therein into the domain computer the domain computer further comprising a database management program for organizing the dynamic client registry;

loading a domain communications server program in response to the appropriate resource locator therefore for execution by the domain computer for responding to resource locators directed to the domain communications server program and directing the database management program in organizing the dynamic client registry;

storing a domain communications resource locator list in the domain computer and each publication computer for causing predetermined functions to be selected for execution in the domain communications server in the domain computer;

storing a client side communications resource locator list in the domain computer and each publication computer for causing predetermined functions to be selected for execution in the client side communications server in each publication computer so that communications between the domain computer and each publication computer cause the selected predetermined functions to be executed dynamically in order to manage information communications between the domain computer and each publication computer;

creating a primary distributed object for transmission by a client side communications server;

creating a receipt request distributed object associated with the primary distributed object, the receipt request distributed object being transmitted by the client side communications server;

transmitting a receipt when the primary distributed object has been received at a client side communications server.

2. The method of claim 1, wherein the step of transmitting a receipt includes the step of creating and transmitting an arrival receipt request distributed object.

3. The method of claim 1, wherein the step of transmitting a receipt includes the step of creating and transmitting an access receipt request distributed object.

4. The method of claim 1, wherein the step of transmitting a receipt includes the step of creating and transmitting a modification receipt request distributed object.

* * * * *